United States Patent
Alonzo, III et al.

(10) Patent No.: US 11,651,336 B1
(45) Date of Patent: May 16, 2023

(54) TIME-VARYING HAPTIC ALERTS FOR COMPUTING DEVICES

(71) Applicant: UIPCO, LLC, San Antonio, TX (US)

(72) Inventors: Edward Manuel Alonzo, III, San Antonio, TX (US); Paul Joseph Craig, San Antonio, TX (US); Robin Mangum, LaVernia, TX (US); Brady Gordon, San Antonio, TX (US); Esteban Rojas, Astoria, NY (US); Kenneth Daniel Zeitung, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 474 days.

(21) Appl. No.: 15/499,504

(22) Filed: Apr. 27, 2017

(51) Int. Cl.
*G06Q 20/10* (2012.01)
*G08B 7/00* (2006.01)

(52) U.S. Cl.
CPC .............. *G06Q 20/10* (2013.01); *G08B 7/00* (2013.01)

(58) Field of Classification Search
CPC .......... G06Q 30/0601; G06Q 30/0613; G06Q 30/0635; G06Q 10/0631; G06Q 20/102; G06Q 20/12; G06Q 20/127; G06Q 20/14; G06Q 20/204
See application file for complete search history.

(56) References Cited

U.S. PATENT DOCUMENTS

| | | | | |
|---|---|---|---|---|
| 8,330,311 | B2* | 12/2012 | Ramsey | F16C 32/0442 310/90.5 |
| 8,754,757 | B1* | 6/2014 | Ullrich | G06F 16/683 340/407.1 |
| 10,169,749 | B2* | 1/2019 | Narayana | G06Q 20/20 |
| 10,236,031 | B1* | 3/2019 | Gurijala | G11B 27/323 |
| 2008/0167919 | A1* | 7/2008 | Clayton | G06Q 99/00 705/7.36 |

(Continued)

OTHER PUBLICATIONS

New testing for the precision haptic EMS, downloaded Jun. 18, 2019 https://www.precisionmicrodrives.com/content/new-testing-for-the-precision-haptic-erms/ (Year: 2019).*

(Continued)

*Primary Examiner* — Daniel S Felten
*Assistant Examiner* — Claire A Rutiser
(74) *Attorney, Agent, or Firm* — Fletcher Yoder, P.C.

(57) ABSTRACT

Techniques are described for determining data dependent alert profiles to be presented on sender and/or receiver computing devices in response to a request for transfer of a data from the sender to the receiver. The alert profiles are determined based on a value of the data. The sender alert profile may be determined based on the information on sender accounts and the receiver alert profile may be determined based on the information on the receiver account. The alert profiles may be determined based on a history of the data transfer between the sender and the receiver, or account history of either the sender or the receiver, or the history of the data transfer within the system. The alert profiles may be presented on computing devices, for example through haptic actuators, to provide a sense of the data value to the user.

19 Claims, 8 Drawing Sheets

(56) References Cited

U.S. PATENT DOCUMENTS

| | | | | |
|---|---|---|---|---|
| 2009/0021473 A1* | 1/2009 | Grant | .................... | G06F 3/016 |
| | | | | 345/156 |
| 2011/0001616 A1* | 1/2011 | Nathan | .................. | G06F 3/016 |
| | | | | 340/438 |
| 2015/0145656 A1* | 5/2015 | Levesque | ............... | G06F 1/163 |
| | | | | 340/407.1 |
| 2016/0063825 A1* | 3/2016 | Moussette | ............... | G08B 6/00 |
| | | | | 340/407.1 |
| 2016/0180661 A1* | 6/2016 | Ullrich | ............... | H04M 19/047 |
| | | | | 340/407.1 |
| 2016/0220198 A1* | 8/2016 | Proud | ................. | A61B 5/0022 |
| 2016/0275483 A1* | 9/2016 | Zhou | ................. | G06Q 20/3278 |
| 2017/0004475 A1* | 1/2017 | White | ................. | G06Q 20/204 |
| 2017/0091753 A1* | 3/2017 | May | .................... | G06Q 20/405 |
| 2017/0124818 A1* | 5/2017 | Ullrich | ................... | G06F 3/016 |
| 2017/0200353 A1* | 7/2017 | Brown | .................... | G08B 6/00 |
| 2017/0330250 A1* | 11/2017 | Arjomand | .......... | G06Q 30/0279 |
| 2017/0359439 A1* | 12/2017 | Beach | ................. | H04L 67/327 |
| 2018/0005497 A1* | 1/2018 | Venkatesan | ......... | H04L 25/4902 |
| 2018/0025350 A1* | 1/2018 | Grossman | ........... | G06Q 20/327 |
| | | | | 705/21 |
| 2018/0336543 A1* | 11/2018 | Van Os | ................ | G06Q 20/223 |

OTHER PUBLICATIONS

Farooq, Ahmed. Haptics in Kiosks and ATMs for the Disabled. MS thesis. 2009. (Year: 2009).*

* cited by examiner

TIME-VARYING HAPTIC ALERTS FOR COMPUTING DEVICES

BACKGROUND

Traditionally, the sender or the receiver of data communicated over a network may receive a general notification regarding the delivery of the data. Some forms of notifications, such as text messages, may have an identifier of the data that helps the user track the delivery. Typically, a receiving device emits some output on receiving such notifications, such as sounds, buzz, or a light on cell phones, and the emitted output is the same across notifications that are of a particular type and/or associated with a particular application.

SUMMARY

Implementations of the present disclosure are generally directed to providing time-varying alerts to sender and receiver devices in response to a request to transfer data from the sender device to the receiver device. More specifically, implementations are directed to alerts with time-varying intensity. The alert intensity may change according to an alert profile that is determined based on priority or status of the data that is being transferred. In some implementations, the level of priority/status of the data can be associated with a value. Presenting the alert according to the alert profile on the user devices provide the sender and/or the receiver with a sense of the data value.

Innovative aspects of some of the implementations specified in this specification can be embodied in methods that include actions of: receiving a send request that is sent from a sender computing device to request a transfer from a sender account to a receiver account, the send request indicating a value to be transferred; determining a first output profile based at least partly on the value; the first output profile indicating a first time-varying (or any other form of alert) output to be presented through a receiver computing device that is associated with the receiver account; and, initiating the transfer of the data from the sender account to the receiver account and, based on the initiating of the transfer, transmitting a first signal to cause the receiver computing device to present, through at least one presenting component the first time-varying output indicated in the first output profile.

Implementations can include one or more of the following features: the at least one presenting component comprises one or more haptic actuators; the first signal configured to instruct the receiver computing device to present the first time-varying output in real time with initiation of the transfer; the method further includes determining a second output profile based at least partly on the value, the second output profile indicating a second time-varying (or any other form of alert) output to be presented through a sender computing device associated with the sender account, and, based on the initiating of the transfer, transmitting a second signal to cause the sender computing device to present, through one or more presenting component (e.g. through haptic actuators or any other proper device component for presentation of the alert), the second time-varying output indicated in the second output profile; the model further describes receiving a specification of the receiver computing device, wherein the specification was sent, through a short-range communication protocol, from the receiver computing device to a sender computing device within a proximity, and, determining the receiver account associated with the specification of the receiver computer device; the first signal includes the first output profile; the first signal includes an identifier of the first output profile that is employed to select the first output profile from a set of profiles stored on the receiver device; the first output profile indicates that the first time-varying output changes, during a period of time, from a minimum intensity to a maximum intensity; the intensity of the first time-varying output at any time during the time period is less than intensity of the first time-varying output at any later time during the time period; the period of time and the maximum intensity are determined based on the value; the second output profile indicates that intensity in the second time-varying output changes inversely with respect to change of intensity in the first time-varying output; the first output profile indicates that the first time-varying output changes from a first minimum intensity to a first maximum intensity over a period of time, and, the second profile indicates that the second time-varying output changes from a second maximum intensity to a second minimum intensity over the period of time; determining the first output profile includes selecting a profile from a profile database, the profile having an indexed identifier that is within a threshold range of the value; determining the first output profile depends at least in part on an amount in the receiver account; the method further includes identifying the sender account based on a sender identification, the sender identification being included in the send request, and, identifying the receiver account based on a receiver identification, the receiver identification being included in the send request; the first signal further causes the receiver computing device to present the first time-varying alert output according to the first output profile, through one or more of: at least one speaker, at least one light, and, at least one graphic presentation; the first signal causes the receiver computing device to present the first time-varying alert output in real time with the first time-varying output; the actions further include sending a second signal to cause the sender computing device to present a second time-varying alert output according to the first output profile, through one or more of: one or more speakers, one or more lights, and, one or more graphic presentation.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations provide technical improvements and advantages over traditional systems. Because traditional systems may require users to accurately remember and enter the receiver credentials (e.g., username, email address, etc.), traditional systems are susceptible to failed attempts caused by wrong, mistyped, or forgotten credentials. However, implementations disclosed herein, may identify the receiver account based on a detection of the receiver device present in a proximity of a sender device. For example, the sender device may detect one or more specifications of the receiver device through a peer-to-peer communication between devices in a proximity (e.g. through short range radio frequency communication protocols such as a near field communication, Bluetooth, etc.). The specifications detected by the sender device may be matched to a receiver account stored on a server, or may include an identification (e.g. a username, email address, etc.) of the receiver account. Accordingly, implementations minimize wrong, mistyped, or forgotten credentials by letting the devices to detect the user credentials. Further, implementations avoid the expenditure of processing capacity, memory, storage space, and/or other computing resources that traditional systems need to expend to store the credentials of the users. Additionally, implementations increase security of transfer due to proximity of the devices. In these implementations, the identity validation is performed in part based on the sender-device (or receiver-device) detection of the receiver-device (or sender-device), which makes the transfer more reliable and secure than a system that pulls the information from a third-party system (for example by selecting account information or account ID of the receiver from a server). Therefore, implementations reduce the risk of security by a malicious third party.

Implementations of the present disclosure further provide one or more of the following advantages. By providing the user a time-varying alert that changes based on a value reflected in the data (e.g., an amount of funds being transferred), the user receives a visceral (e.g., haptic) indication of what is being transferred without having to check the data value manually. This results in increase of data transfer speed and reduction on network traffic because a server sends out a single alert that precludes the need for the user to log into and/or check his account to verify that the requested data transfer has been performed. Further, precluding the need to recheck the accounts provides more positive user experience compared to traditional techniques in which the individual may have to log into or review his account to check whether the right data has been transferred.

Moreover, the present implementations provide a more reliable data transfer that reduce the risk of overlooking the value of what is being transferred. Traditional notifications inform the users about a transfer of data, without distinguishing the alert presentations for different data values. Although some of the traditional notifications include identifications, such as a docketed number, of the data, such notifications still are not strong enough to alert the user about the potential mistakes, on the spot. In contrast, the implementations disclosed herein provide one or more physical alerts, such as haptic, sound, light, graphical presentation, etc. on the user computing device based on the data value. These value dependent perceivable alerts are presented to inform the user about what is being transferred (e.g. in real time with the transfer) or what has recently been transferred (e.g. as soon as the user reached to his device or logs back into his account). In other words, the implementations disclosed herein associate the data value with a perceivable output can be described as analogous to a weight of physical currency, even in instances where the transfer of the value itself is performed electronically over a network. Therefore, the implementations give the user the ability to know about potential mistakes soon enough to cancel the transfer of data or take any other appropriate action before it gets too late. Moreover, the implementations provide an additional confirmation of the transferred value, which can be especially useful for people with some disabilities, such as non-sighted or poorly sighted people, who may otherwise have difficulty reviewing the transfer and detecting errors in the transferred amount. Some implementations may present alerts to the user even before the transfer begins. These implementations may require a user confirmation of the data or the data value before starting the data transfer.

In some implementations, the alerts are presented according to one or more alert profiles. An alert profile may represent a change in the intensity of an alert to be presented on a user device, over time. The alert profiles are determined according to the data value. In some implementations, the alert profiles are saved in an alert profile database located on user computing devices or a server. In some implementations, the alert profiles are generated based on pre-determined formulas or algorithms that based on the data value. In some implementations, the alert profiles may also be based on information on the user accounts, such as a history of data transfer, a pre-determined threshold value, the identity of contacts to/from whom data is being transferred, etc. Over time, the implementations may refine the algorithms of determining the alert profiles based on ongoing data transfers.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
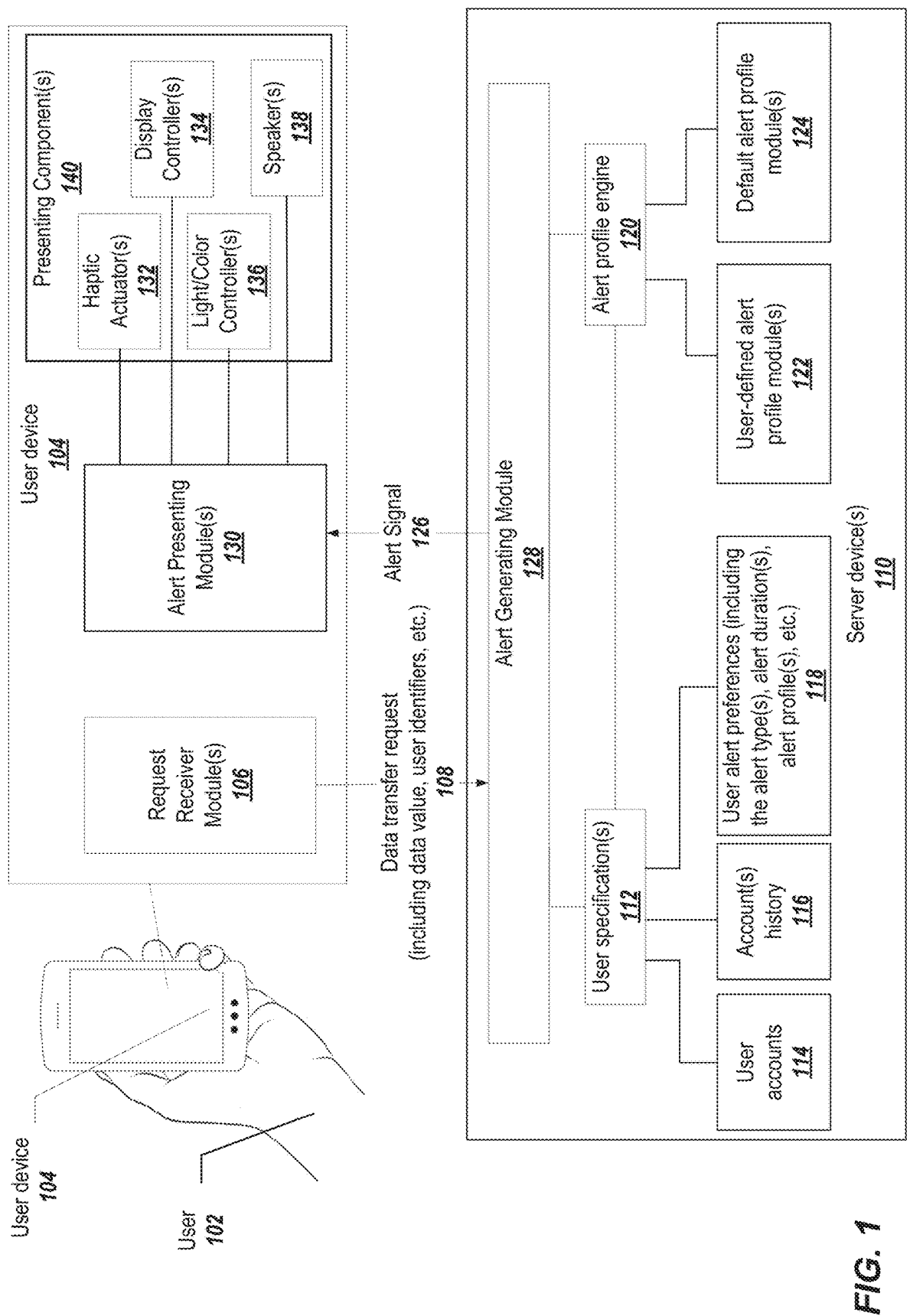
FIG. 1 depicts an example system for sending an alert output profile to a user computing device in responses to a request to transfer data, according to the implementations of the present disclosure.

Implementations of the present disclosure are directed to systems, devices, methods, and computer-readable media for providing data transfer alerts at least partially based on priority and/or value of the targeted data, or a value reflected in the data. In some implementations, the data priority and/or status may be depicted by a data value. In some implementations, the data may reflect one or more values. For example, the data may reflect a monetary value, title, license, etc. Examples of the data can be digital files such as images (e.g. personal images, drawings, etc.), documents (e.g. deeds, certificates, statistics, etc.), cash, tokens, points (e.g. game points), intellectual property (e.g. patents, trade secrets, etc.), or computer implemented items (e.g. a software performing specific algorithm, etc.), etc. An alert that presents transfer of a data may provide a sense of the data value to the user.

Alerts may be presented through the sender device and/or the receiver device. The alerts may be in form of tactile, visual, and/or audible alerts (e.g., motion, voice, light, graphic presentation, etc.). Each alert may be provided according to an alert profile. An alert profile, when presented on a device, may represent the value of the data being transferred. For example, a high-value item may have a louder or longer alert than a low-value item. An alert profile may indicate a change in alert intensity as a function of time. An alert profile may be configured to present an alert on a device in real time with the data transfer, causing the presentation to be initiated according to the initiation of the data transfer. For example, real time presentation may cause the alert to start playing at the same time that the data transfer initiates. In some implementations, the real time presentation may cause the alert to start playing at some point during the transfer of the data (e.g., after the initiation of the data transfer, but before the data transfer has completed). In some implementations, the real time presentation may cause the alert to keep playing while the data is being transferred. In some implementations, the real time presentation may cause the alert to be presented right before the initiation of data transfer (e.g. as a notification that the data transfer is about to initiate).

A described herein, a real time operation is an operation that is performed, in response to a triggering event, without any unnecessary delay between the detection of the triggering event and the initiation of the real time operations, beyond the delay that may be caused by network communication latency, the time needed for communicating data internally (e.g., on a data bus), the time to store data or access stored data, processing time, and/or other types of delay inherent in the computing systems used to perform the operations. A real time operation may also be described as a dynamic operation with respect to the triggering event. In some instances, the real time operation is synchronous with respect to the triggering event. In some instances, the real time operation may be performed by a same process or thread, and/or within a same execution path, and an operation that detects (or performs) the triggering event.

An alert profile for the sender computing device may be different from or similar to an alert profile for the receiver computing device. An alert profile to be presented on the receiver device may indicate that the intensity on the receiver side changes inversely or directly with respect to intensity changes of an alert on the sender side to be presented by the sender computing device. For example, an ascending profile for the sender side may indicate an increase in the amount of money that is being transferred out, and an ascending profile for the receiver side may indicate an increase in the money being transferred in. The intensity of alerts on both sender and receiver may be presented by a single alert profile or by different alert profiles. For example, an implementation may use a descending profile to indicate an increase in the data value that is being transferred out (sender side) while using an ascending profile to indicate an increase in the data value that is being transferred in (receiver side).

In some implementations, the alert profiles may represent a change in alert intensity based on one or more relative data values (user specific profiles). In some implementations, the relative data value may be presented based on the data value compared to a second value in the user account. The second value in the user account may be the total value in the account, or a threshold value that the user has preset. The alert intensity may change according to the value or the relative value of the data being transferred. For example, in an implementation where the relative data value is based on the total value of the sender account, if the sender transfers out one half of her total account value, the alert profile may cause an alert to be played for longer period of time or may drop a descending alert intensity to a lower minimum amplitude, than if the data value was only one hundredth of the total account value.

In some implementations, one or more alert profiles may be presented via one or more presenting components. In some implementations, different presenting components may be provided for different transfers, for example, based on the relative value, account history, time of the transfer, etc. In some implementations, the same presenting components may present different themes for different transfers. For example, different songs or noises may be played for transfer of different values. The songs in this example may correspond to one or more alert profiles.

In some implementations, the relative data value may be determined based on other transaction parameters, and/or user parameters. An example transaction parameter can include the date of the transfer. Example user parameters can include an account history of the user, debts of the user, income of the user, etc. In some implementations, the alert profile may vary based on the date of the transfer. In some implementations, the account profile may be determined based on how the transaction may affect the user account in present state or in close future. A transaction that critically affects the user account may be presented with a more intense alert than a milder affecting transaction. For example, transferring a hundred dollars at the beginning of the month may cause a more intensive alert than transferring the same amount of money at the end of the month. As another example, receiving a hundred dollars for a receiver with two hundred dollars of income per week may generate more intensive alert than for a receiver with a thousand dollars of income per week. In some implementations, the alert profile may warn the user of an unusual transaction. The unusual transaction may be determined based on a history of the transactions to/from the user account. For example, a user who has a history of sending money normally in magnitudes of tens of dollars may get a more intensive alert when he sends out a thousand dollars compared to when he sends out twenty dollars. In some implementations, the system refines the alert profiles based on ongoing data transfers for specific users. In some implementations, the system refines the data profiles based on the ongoing data transfers regardless of the sender's and receiver's account information.

The intensity of an alert may be presented by amplitude, frequency, pitch, tone, timbre, texture, power level, or the time period (duration) of playing the alert on the corresponding computing device. The alert profile indicates the changes in the alert intensity. In some implementations, the alert profiles indicate the changes in the intensity as a function of time. In some implementations, the alert profile may indicate that a more intense alert be played longer than a less intense alert. In some implementations, the alert profile may indicate a higher maximum-power for a more intense alert than a less intense alert. For example, a more intensive haptic alert may cause actuators on user device to move faster and/or in a more power consuming mode, than a less intensive haptic alert. In some implementations, the alert profile may depend on the computing device that presents the alert; for example, an alert profile to be presented on a tablet computer may have a longer time period than for a smart watch. In some implementations, the intensiveness depends on the user preferences; for example, the user may preselect a time period for presenting the alert.

FIG. 1 depicts an example system for sending an alert output profile to a user computing device in response to a request to transfer data, according to the implementations of the present disclosure. The data transfer may be requested by a user 102 as the sender. The sender may request the data transfer using a computing device 104, such as a smartphone, a tablet computer, a smart watch, etc. The computing device may have the capability of being held or worn. The sender may request the data transfer through an application or any other user interfaces installed on a computing device. The send request may be obtained from the sender through request receiver module(s) 106. The request receiver module(s) 106 can be parts of the computing device 104, or a secondary computing device in connection with the computing device 104. The request receiver module(s) 106 submits data transfer request 108 to the server device(s) 110. The server device(s)110 may generate or determine an alert profile through alert generating module 128. The alert generating module 128 may generate or determine an alert based on the information on user specification(s) 112 and with the help of alert profile engine 120. The server device(s) 110 may send an alert signal 126 from the alert generating module 128 to alert presenting module(s) 130. The alert signal 126 may include the alert profile generated by the server device(s) 110, or an identification of an alert profile stored in a set of alert profiles on the computing device 104 or on a secondary device in connection with the computing device 104. The alert presenting module(s) 130 may include drivers that run one or more presenting components 140. The one or more presenting components 140 may present one or more alerts according to the alert profile. For example, the alert presenting component(s) 140 may present the alert through haptic actuator(s) 132, display controller(s) 134, light/color controller(s) 136, or speaker(s) 138, etc.

The user 102 may have one or more account(s) 114 on the server device(s) 110. Further, a user device may be connected to a secondary account to receive alerts due to any changes in the secondary account. For example, a parent computing device may be connected to her teenage son's account to receive alerts for the withdrawals of money from the account. A user may store a variety of items in his accounts. The stored items may include objects. Each item may have an objective or a personal value. For example, if a user stores a drawing in his account, the drawing may have a high personal value to him because his deceased mother drew it and it reminds him of her love. Another drawing may have a lower personal value to him because it was a caricature of his college professor. Notwithstanding, the drawing may also have an objective (e.g., market) value. The user may store the value of an item according to its market value, personal value, his estimation, or any other value that he desires, in his account. The user may scale each value into a monetary value. For example, the user in the above example may scale his mother's drawing to a million dollars, but scale the caricature of his college professor to a ten dollars.

The sender may send a request to transfer data, by selecting, inserting, or typing an identification of the data to be transferred. For example, the sender may type in an amount of money or an identification of an item in his account, or select one of his drawings from his account. The request may also include an identification of the receiver. Examples of the receiver identification could be a username, an email address, a phone number, or a device specification associated with another account in the server. The sender may type in, select, or insert the receiver identification in the request. In some implementations, the sender device may recognize the receiver device or an identification (e.g. username, account name, email address, etc.) of a receiver when the receiver device is in the proximity. The sender device may recognize the receiver device or identification through a short-range peer-to-peer communication. Example short-range communication includes near-field-communication (NFC), Bluetooth, and WiFi.

The send request may be obtained from the sender using one or more request receiver modules 106. The request receiver module 106 submits a send request (e.g., data transfer request 108) to the server 110. The data transfer request 108 may include an identifier that uniquely identifies the data, the receiver, or the sender. The server may verify or identify the sender and/or the receiver accounts based on the identifications of the sender and the receiver in the data transfer request 108. The sender/receiver identifier may be a username, an email address, a user computing device specification, etc. In some implementations, sender and receiver devices may get into an authentication scheme. For example, each device may exchange standards, encryption, certifications, or keys (such as each other's public RSA keys) to validate or authenticate the other device for a secure transaction. In some implementations the data transfer request 108 may include encryption standards, keys, certifications, etc. of the sender/receiver devices to let the server validate, authenticate, or secure (etc.) the data transfer.

In some implementations, the request receiver module 106 may add a receiver identifier to the data transfer request 108, by determining a receiver identification based on a specifications of the receiver device detected by the sender device. For example, the request receiver module 106 may have a list of the accounts associated with device specifications and provide the receiver account that matches the detected device specification. In some implementations, the request receiver module 106 may include in the data transfer request 108 a receiver identifier that the sender has inserted or the receiver identifier that that the sender computing device has detected.

Once the data transfer request 108 is received on server 110, alert generating module 128 analyzes the request based on the information on the accounts (user specification(s) 112) and determines one or more alert profile with the help of the alert profile engine 120.

The user specification(s) 112 may include information on the user account(s) 114, user account(s) history 116, user alert preference(s) 118, etc. The user account(s) 114 may include one or more accounts associated with the sender (or receiver) identification. The user account(s) 114 may also include items and their values in each account. The user account(s) 114 may also include transfer limitations, such as a threshold on the values to be sent out (received in), restriction on what data to be sent out to (received from) whom, limits on the transfer dates, etc. The accounts(s) history 116 may include a list of the recent transactions on each account. For example, the account(s) history 116 may have a history of the amounts and the dates of payments to an account, a trend of data transfers from and to the account, a list of the users with whom transactions have been done, etc. The user alert preference(s) 118 may include a list of alert characteristics that the user has preselected. For example, the user alert preference(s) 118 may include alert type (e.g. sound, tactile, color, etc.), alert duration (e.g., the time period for playing the alert, etc.), alert profile (e.g. an ascending/descending profile, an exponential or linear profile, a continuous or disconnected profile, etc.). The user preference(s) 118 may also include specific alert profiles for particular users. In some implementations, the server 110 may associate specific alert profiles to particular users. Such an association may have been selected based on the particular users' preferences or according to their accounts history. In some implementations, a user may associate particular users with specific alert profiles, in his own account. For example, user X may associate user Y in his contact list, with an intense alert profile; may choose to associate new users that are out of his contact list with a short alert profile; or may associate a group of his family members with multiple (more than one) alert profiles to be played on multiple alert presenting modules.

The alert profile engine 120 may include modules for generating/determining of alert profiles based on the information on user specifications 112 and/or data transfer request 108. Alert profile engine 120 may use the user-defined alert profile module(s) 122, if the user has specified one or more particular alert profiles, for example, in the user alert preference(s) 118. The user-defined alert profile module(s) 122 may keep the form of the profile that the user has specified, and change other parameters of the profile based on the value of the data. For example, if a user has selected an ascending alert profile the user-defined alert profile module(s) 122 may determine the time period for playing the alert, a minimum or maximum intensity of the alert, or the rate of changing the intensity in the alert profile.

The alert profile engine may use the default alert profile module(s) 124, if the user has not specified any preferences for the alert profile. In some implementations, the default alert profile module(s) 124 may determine an alert profile based on the data value and one or more of the parameters in the user account(s) 114 (e.g. the limitations on a transfer, etc.), or in the user account(s) history 116. For example, depending on how far the data value is from a threshold value set in the user account(s) 114, the default alert profile module(s) 124 may set a different maximum/minimum intensity, or duration for the alert profile. As another example, if the user has restricted sending his mother's drawing to only his close family, the default alert profile module(s) 124 may determine an alert profile with high intensity to warn the sender before or during the transfer of the drawing to non-family receivers. In some implementations, the default alert profile module(s) 124 may determine the alert function notwithstanding the information in the user specification(s) 112, and solely based on the value of the data.

In some implementations, the default alert profile module(s) 124 may generate the alert profile according to one or more formulas or algorithms. In some implementations, the formulas and algorithms for determining the alert profile may be refined based on the ongoing data transfers; these refinements may be particular to the users or be based on the overall data transfers in the system. In some implementations, the default alert profile module(s) 124 may be connected to an alert profile database (for example database 220, which is connected to the server 210 in FIG. 2). The alert profile database may include a set of alert profiles. Each alert profile in the alert profile database may be associated with an indexed profile identifier. The indexed profile identifier may include a value. The default alert profile module(s) 124 may select the alert profile with a value comparable with the value of the data to be transferred. In some implementations, the default alert profile module(s) 124 selects the alert profile with a value that matches the data value. In some implementations, the default alert profile module(s) 124 may select the alert profile associated with a value closest to the data value.

Depending on the system preferences, one or both of the user-defined alert profile module(s) 122, and the default alert profile module(s) 124 may function to determine the alert profile. For example, if the user has pre-selected a set of alert profiles, the default alert profile module(s) 124 may select an alert profile from the user's set (instead of from an alert profile database 220), and the user-defined alert profile module(s) 122 may determine other specifications of the alert profile such as the maximum and the minimum intensities. In some implementations, the system may be designed to give priority to one of the user-defined alert profile module(s) 122 and the default alert profile module(s) 124. For example, if the function of the two modules overlap, the system may be designed to discard the overlapping portions determined by the default alert profile module(s) 124.

Figure 2:
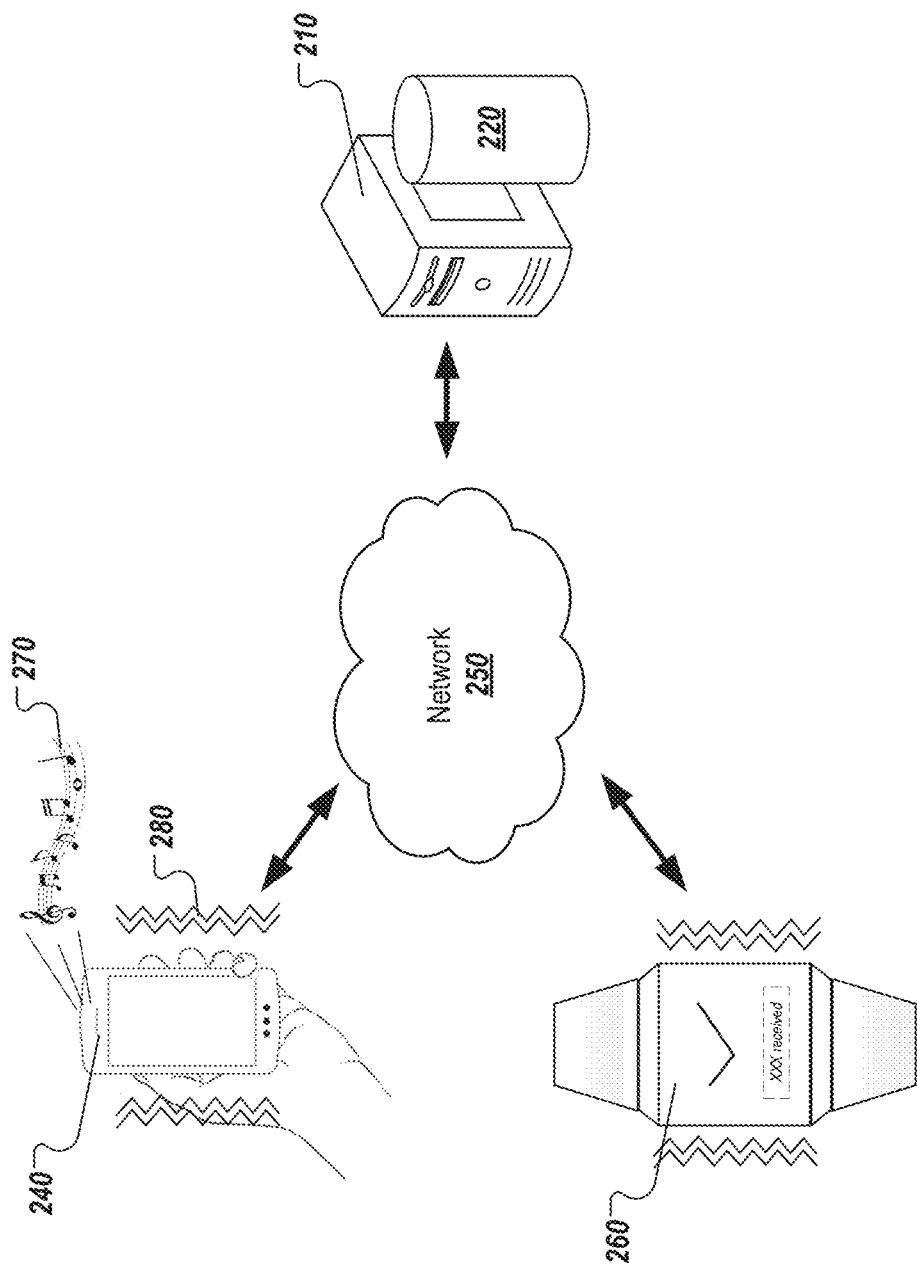
FIG. 2 is an example system of two user computing devices and a server participating in data transfer, according to the implementations of the present disclosure.

Alert generating module 128 may send an alert signal 126 to alert presenting module(s) 130 to present the alert profile determined by module(s) 122 and 124, on a user computing device. FIG. 2 depicts an example implementation where the alert signal 126 is transferred from server 210 (e.g. server device(s) 110) through network 250, to one or both of the sender computing device 240 and the receiver computing device 260. FIG. 1 depicts the alert presenting module 130 on the user device 104. However, the alert presenting module 130 may be located on the sender computing device 240 (e.g. the user device 104) or a secondary device connected to the sender computing device 240. Similarly, the alert presenting module may be implemented on the receiver computing device 260 that is connected to the server 210 through network 250, or on a secondary computing device connected to the receiver computing device 260.

The alert signal 126 may include the alert profile, or may include an identifier of the alert profile. The identifier of the alert profile may be employed to select the alert profile from a set of alert profiles stored on the alert presenting module(s) 130, or on a device connected to the module(s) 130. The alert presenting module(s) 130 may present an alert through one or more device components and according to the alert profile. Examples of the device components that present the alert may be haptic actuator(s) 132, display controller(s) 134, light/color controller(s) 136, speaker(s) 138, etc. For example, FIG. 2. depicts sound alert 270 and haptic alert 280 being presentenced on sender computing device 240.

Figure 3A:
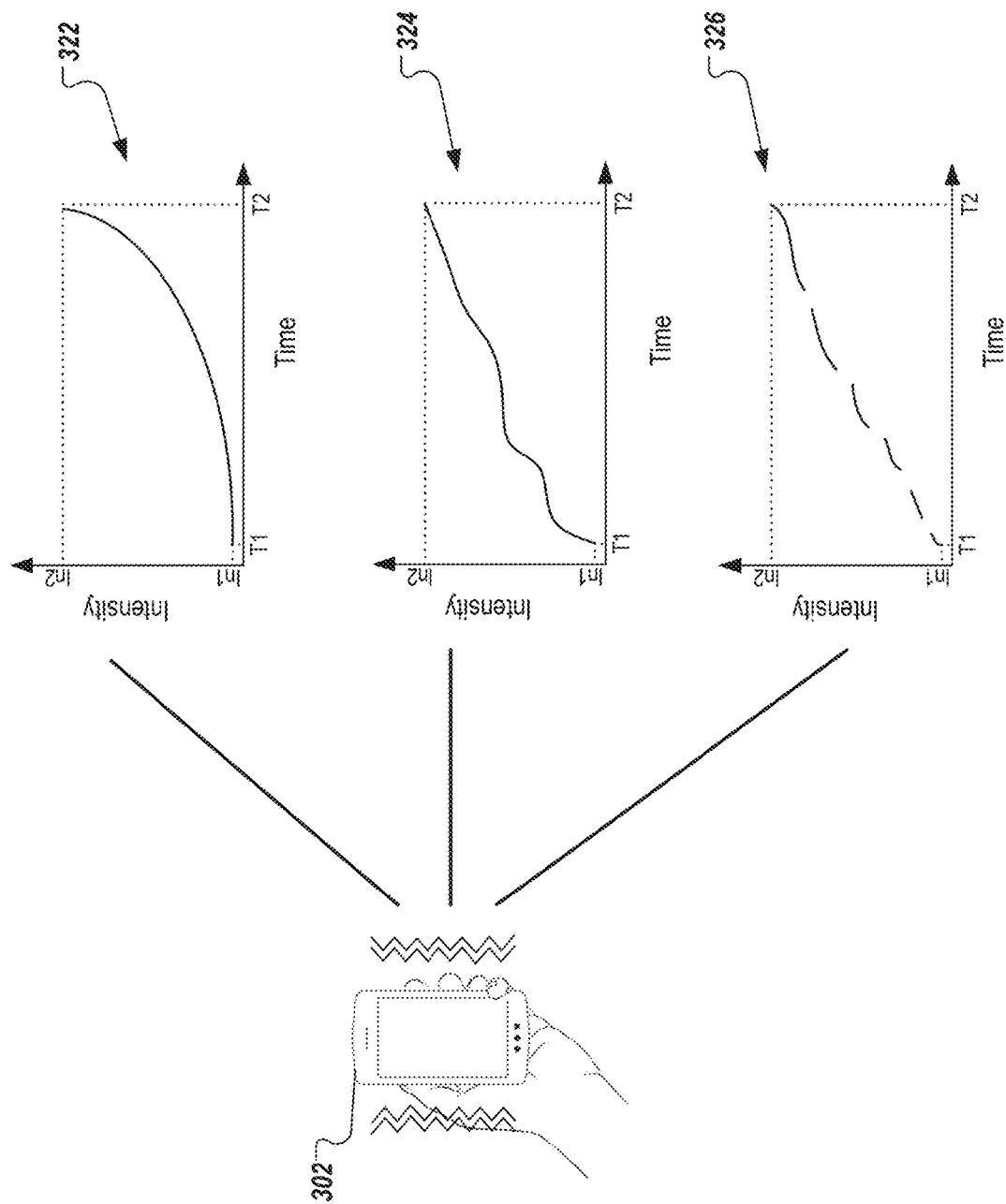
FIGS. 3A and B show examples of alert output profiles to be presented on user computing devices, according to the implementations of the present disclosure.

FIG. 3A depicts a few example alert profiles generated by the alert generating module 128, for presentation on the user device 302 (e.g. the sender computing device 240, the receiver device 260, or a secondary device in connection with either device 240 or 260). The examples of FIG. 3A are haptic alert profiles with ascending intensity over a time period from T1 to T2. Other alert profiles not shown in the figure may present other trends of changes in alert intensity over time. Alert profile 322 shows an exponential change of the alert intensity. Alert profile 324 depicts a random continuous ascending profile with a minimum intensity In1 and a maximum intensity In2. Alert profile 326 depicts a disconnected profile with a minimum intensity In1 and a maximum intensity In2. The intensity and the play duration in alert profile 326 ascend over a time period from T1 to T2. Other alert profiles may indicate change of the alert intensity in forms of linear, quadratic, exponential, or other type of function, or a combination of one or more functions. In some implementations, similar to the alert profile 322, an alert profile may indicate the alert intensity as a function of time that increases during the alert profile's time period. For example, the first derivative of the function may be positive at any point on the alert profile, such that the alert intensity at any time (T0) may be lower than the alert intensity at any later time (T0+t) during the alert profile time period. In some implementations, the alert profile may indicate the alert intensity as a decreasing function, having negative derivative at any time within the alert profile time period.

Figure 3B:
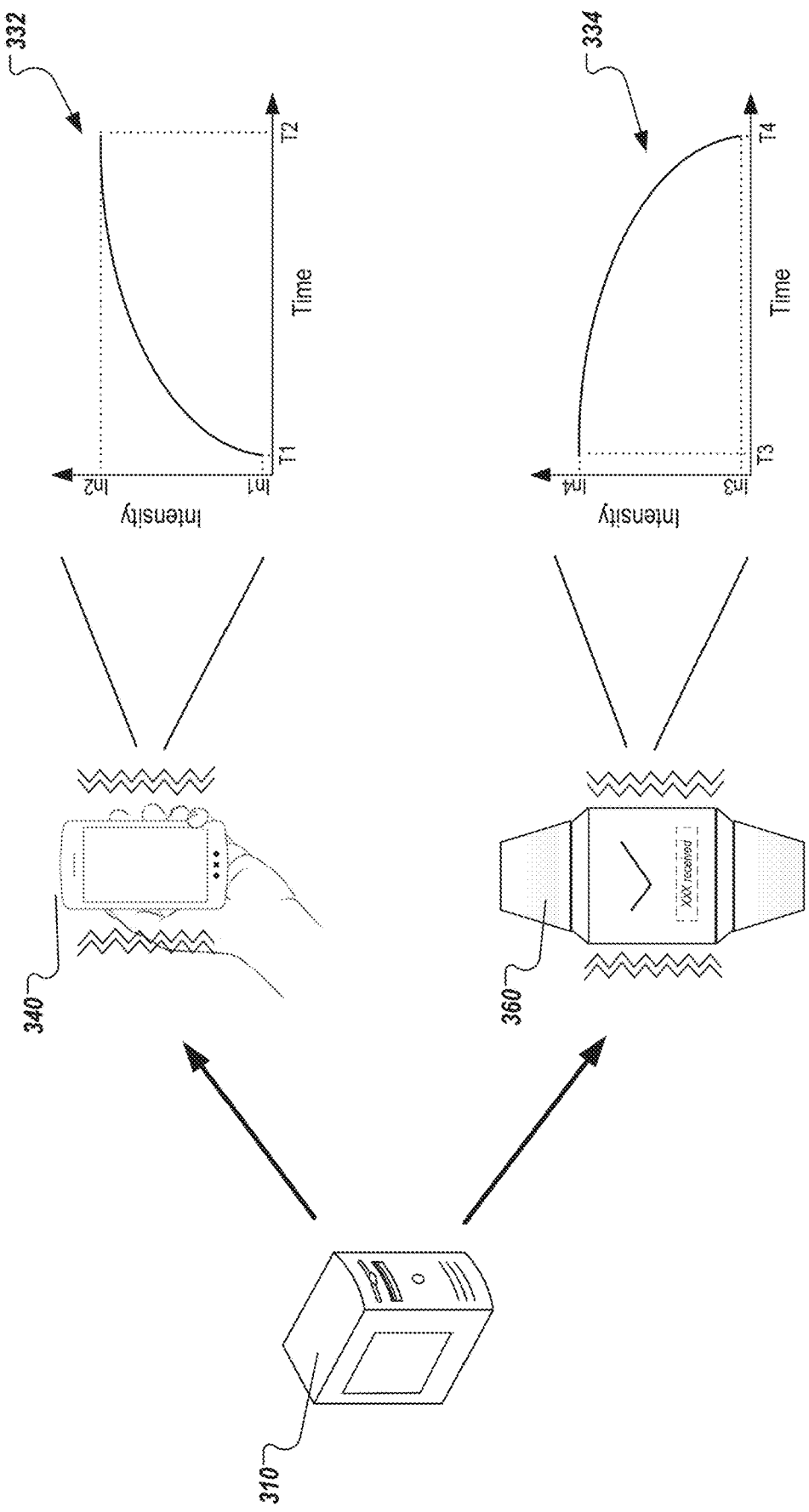

The alert profile presented on the sender side may be similar or different from the alert profile presented on the receiver side. The alert intensity on the sender side may change directly or inversely with respect to the intensity changes on the receiver side. FIG. 3B is an example implementation where sender alert profile 332 depicts the intensity on the sender side that changes inversely with respect to the intensity on the receiver side according to the receiver alert profile 334. The server 310 (e.g. server device(s)110) may be designed to produce an ascending alert profile 332 for the sender computing device 340, and a descending alert profile 334 for the receiver computing device 360, or vice versa. Some implementations may use a formula to generate the inverse or direct changes in the intensity. For example, to provide inverse changes, assuming that the sender alert profile 332 is presented by function S(t), where t is time and S(t) is the sender alert intensity at time t, the receiver alert profile 334 may be presented by R(t)=S(T2-t), where R(t) is the receiver alert intensity at time t, and T2 is the ending time in sender alert profile 332. As another example, R(t)=S(2t+T1) presents a direct change of the intensity in the receiver side with respect to the sender side.

Figure 4A:
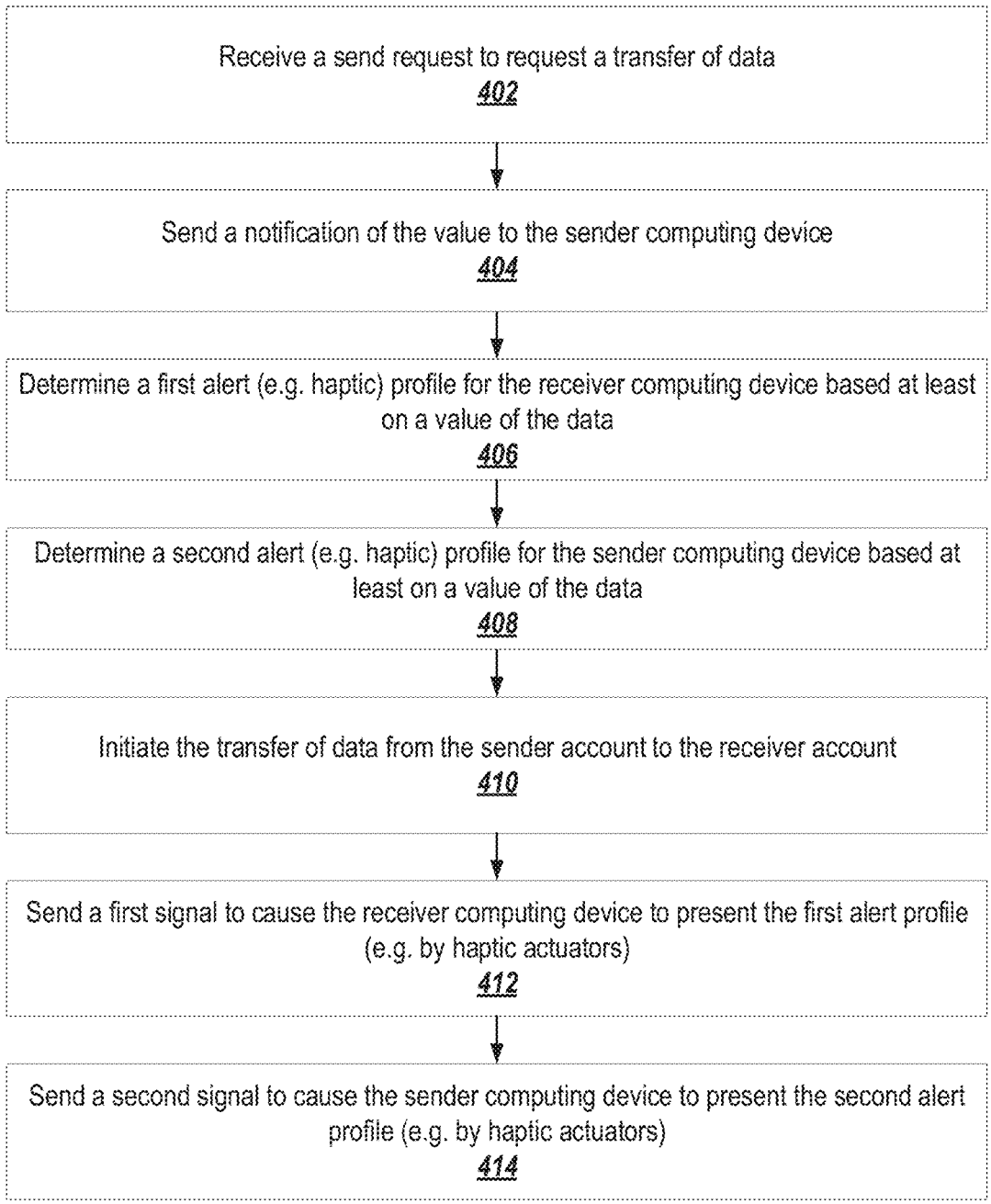
FIG. 4A depicts a flow diagram of an example process for providing alert profiles to user computing devices, according to the implementations of the present disclosure.
Figure 4B:
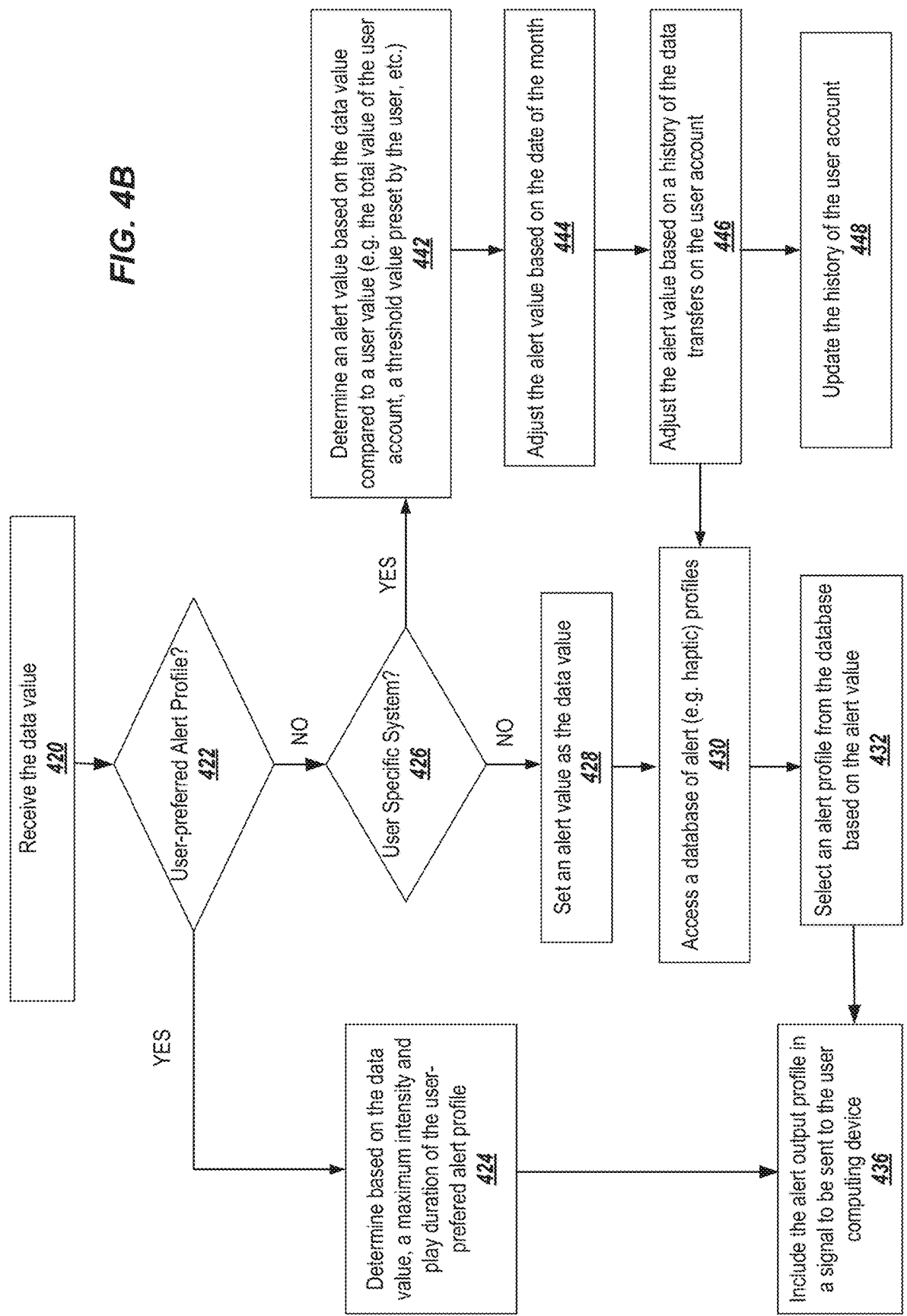
FIG. 4B depicts a flow diagram of an example process for determining an alert output profile, according to the implementations of the present disclosure.
Figure 4C:
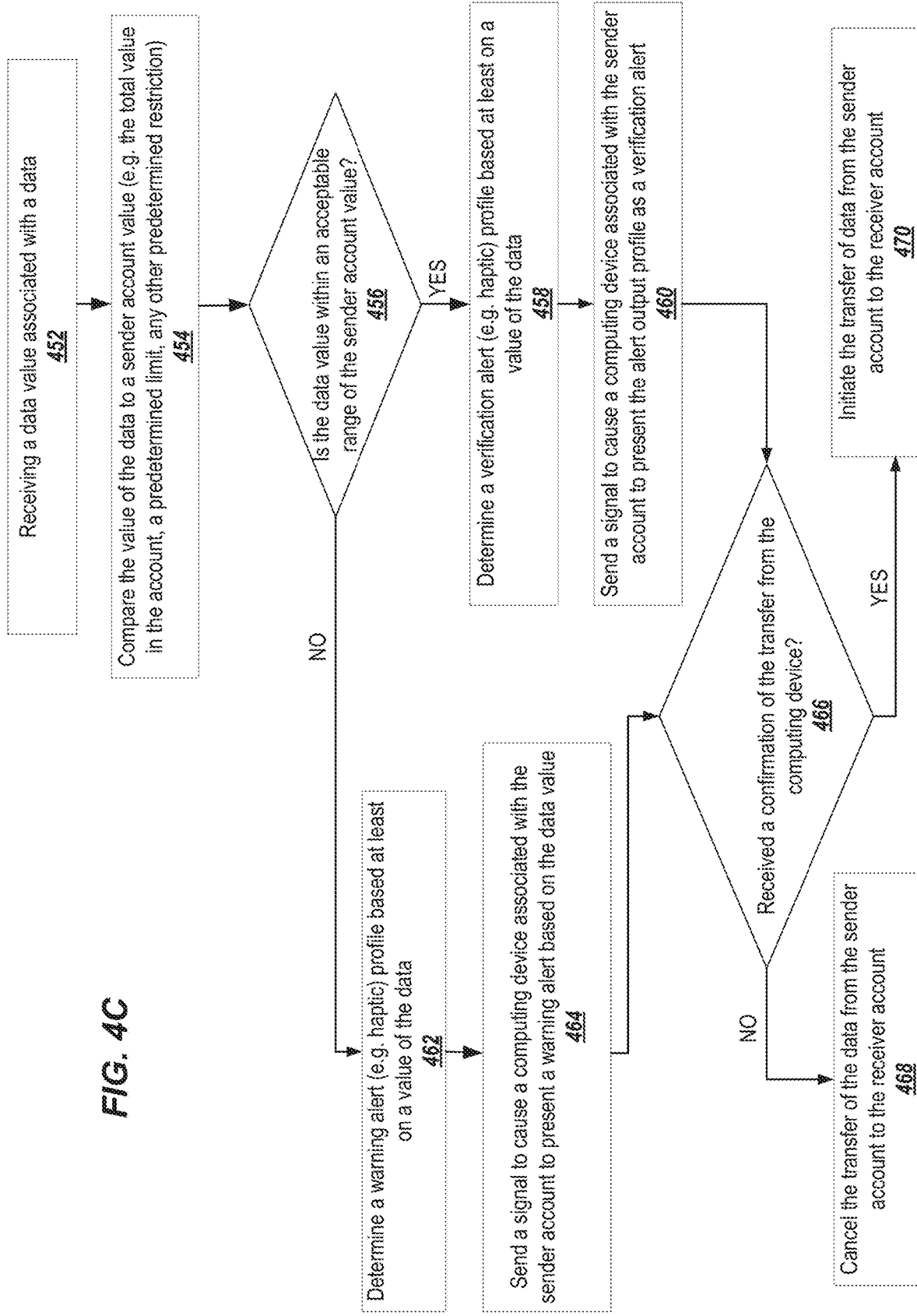
FIG. 4C is a flow diagram of an example process for alert profiles that notify the users about the data to be transferred, according to the implementations of the present disclosure.

FIG. 4A depicts a flow diagram of an example process for providing alert profiles to user computing devices, according to the implementations of the present disclosure. FIG. 4B depicts a flow diagram of an example process for determining an alert output profile, according to the implementations of the present disclosure. FIG. 4C is a flow diagram of an example process for alert profiles that notify the users about the data to be transferred, according to the implementations of the present disclosure. Operations of the process may be performed by one or more of the request receiver modules 106, alert generating 128, alert presenting modules 130, and/or other software module executing on the sender or receiver devices 240 and 260 or on secondary devices connected to the sender or receiver devices, the server devices 110, or elsewhere.

The data transfer request 108 (e.g., send request) may be received (402) as described above. The send request may include an identification of the data to be transferred. In some implementations, the identification of the data includes a data value. In some implementations, a value is associated with the data and is stored in the user account. The send request may also include an identification for the sender and an identification for the receiver, as described above.

In some implementations, the server sends a notification to the sender computing device (404) to remind the sender of the value of the data to be transferred. The notification may be in the form of a general notification or based on an alert profile specific to the user and/or based on the value of the data to be transferred.

In some implementations, a first alert profile may be determined (406) based on the data value. The first alert profile may be determined based on a receiver account information. The first alert profile may also be determined based on the limitations of the receiver computing device (e.g. what types of alerts with how much intensity can be performed on the device). In some implementations, a second alert profile may be determined (408) based on the data value, to be presented on the sender computing device. The second alert profile may be determined based on the sender account information and/or limitations of the sender computing device.

The transfer of the data from the sender account to the receiver account may be initiated (410), a first signal may be sent to the receiver computing device (412), and/or a second signal be sent to the sender computing device (414). The first and/or second signal may be alert signal 126. The sender computing device may be device 240, or 104 and the receiver computing device may be device 260. The first signal and/or the second signal may be sent out to the corresponding devices, at the same time or at different times. The data transfer may be initiated simultaneously as the first and/or the second signals are sent out, or may be initiated with a time gap after or before sending the signals out. For example, the second signal may be sent to the sender computing device, then the data transfer may initiate, and upon the completion of the data transfer, the first signal may be sent out to the receiver computing device.

Determining the first and/or the second alerts (406 and/or 408) may be accomplished according to flow diagram of FIG. 4B. Accordingly, data value may be received (420) and analyzed to determine one or more alert profiles to be added to the signal (the first or the second signal) that is being sent to the user devices (436). By checking the user alert preferences 118 (for the sender or the receiver whose alert profile is being determined), a determination is made on whether the user has one or more preferred alert profiles (422). If the user has specified preferred alert profiles, the user defined alert profile module(s) 112 may determine a maximum intensity and a play duration for the preferred alert profile based on the data value (424). The final alert profile (which is a modification of the user preferred alert profile according to the maximum intensity and the play duration) is included in the signal to be sent to the user computing device (436).

If the user has not specified a preferred alert, by checking the process preferences, a determination is made on whether the present system (or method) is a user-specific system (or method to be implemented by a system) (426). The system preferences may be adjusted by the server administrator, or by each user for her own accounts. If the system is not a user-specific system, the default alert profile module(s) 124 may determine the alert profile. Accordingly, an alert value may be set as a function of the data value (428), a database of alert profiles may be accessed (430), and an alert profile with an indexed identifier matching the alert value may be selected (432). In some implementations, each indexed identifier may be assigned to a profile value. In some implementations, the alert profile with a profile value closest to the data value may be selected (432). The selected alert profile may be included to the signal to be sent out to the user device (436).

If the system is a user-specific system, one or both of the user-defined alert profile module(s) 122 and the default alert profile module(s) 124 may function to determine the alert profiles. Accordingly, an alert value may be determined based on the data value and the information in the user account(s) 114. In some implementations, the alert value may be determined by comparing the data value to a threshold value in the user account (442). The threshold value in the user account may have been set by the user, or may be based on the total value of the items in the user account (e.g., total value of the user account). In some implementations, the alert value may be determined based on the date of the data transfer (444). For example, for a user who gets paid monthly, the alert value may be different when the user sends out a hundred dollars at the beginning of the month compared to sending it out at the end of the month. In some implementations, the alert value may be calculated according to the user account(s) history 116 (446). For example, the alert value may be different when an item is being sent to a receiver for the first time than for the second time in an hour. The user account(s) history 116 may be updated to reflect the ongoing data transfer (448). The alert profile database may be accessed (430), and an alert profile may be selected based on the alert value (432) as described above. The selected alert profile may be included in the signal to be sent out to the user device (436).

Before initiation of the data transfer, a notification may be sent to the sender to confirm the data or the data value that is about to be transferred (404 in FIG. 4A). FIG. 4C is a flow diagram of an example process for determining the confirming notification, according to the implementations of the present disclosure. The data value may be received (452) by the send request or by determination of a value associated with the data in the user account.

The data value may be compared to a sender account value (454), such as the total account value, a threshold value, etc. Based on this comparison, a determination may be made on whether the data value is within an acceptable range of the sender account value (456). If the data is within the acceptable range, a verification alert profile may be determined (458). If not, a warning alert profile may be determined (462). In some implementations, the verification alert profile and/or the warning alert profile may be generated based on the data value. In some implementations, the verification alert profile may be different from the warning alert profile. For example, the verification alert profile may have a lower maximum-intensity than the warning account profile. In some implementations, the device component to present the verification alert profile on the user device may differ from the device component to present the warning alert profile and the alert profiles may be determined according to the device components that are presenting them. For example, the verification alert may be presented in a graphic notification, and the warning alert may be presented by a combination of time-varying haptic and graphic alerts. If the verification alert profile is determined (458), the verification alert profile may be sent to the sender computing device (460) to be presented through the alert presenting module(s) 130. Similarly, if the warning alert profile is determined (462), the warning alert profile may be sent to the sender computing device (464) to be presented through the alert presenting module(s) 130.

The transfer of data may be concluded based on whether a confirmation is received from the sender computing device (466). If a confirmation is received from the sender, the transfer of data may initiate. If no confirmation is received, or a declination is received from the sender, the data transfer may be canceled. The process in FIG. 4C may be performed with respect to one or both of the sender account and the receiver account.

Figure 5:
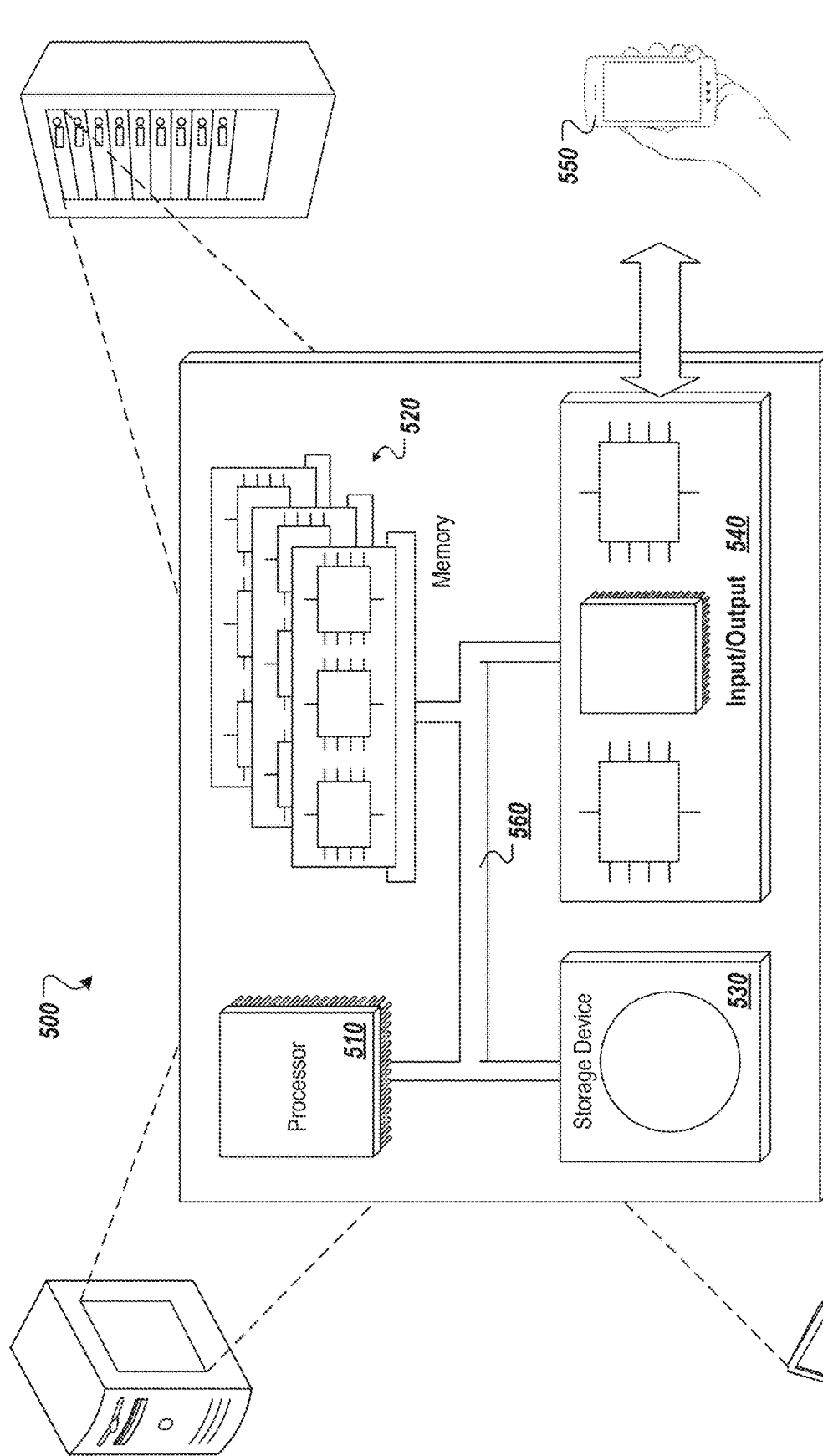
FIG. 5 depicts an example computing system, according to implementations of the present disclosure.

FIG. 5 depicts an example computing system, according to implementations of the present disclosure. The system 500 may be used for any of the operations described with respect to the various implementations discussed herein. For example, the system 500 may be included, at least in part, in one or more of the user device 104, the server device(s) 110, and/or other computing device(s) described herein. The system 500 may include one or more processors 510, a memory 520, one or more storage devices 530, and one or more input/output (I/O) devices 550 controllable through one or more I/O interfaces 540. The various components 510, 520, 530, 540, or 550 may be interconnected through at least one system bus 560, which may enable the transfer of data between the various modules and components of the system 500.

The processor(s) 510 may be configured to process instructions for execution within the system 500. The processor(s) 510 may include single-threaded processor(s), multi-threaded processor(s), or both. The processor(s) 510 may be configured to process instructions stored in the memory 520 or on the storage device(s) 530. The processor(s) 510 may include hardware-based processor(s) each including one or more cores. The processor(s) 510 may include general purpose processor(s), special purpose processor(s), or both.

The memory 520 may store information within the system 500. In some implementations, the memory 520 includes one or more computer-readable media. The memory 520 may include any number of volatile memory units, any number of non-volatile memory units, or both volatile and non-volatile memory units. The memory 520 may include read-only memory, random access memory, or both. In some examples, the memory 520 may be employed as active or physical memory by one or more executing software modules.

The storage device(s) 530 may be configured to provide (e.g., persistent) mass storage for the system 500. In some implementations, the storage device(s) 530 may include one or more computer-readable media. For example, the storage device(s) 530 may include a floppy disk device, a hard disk device, an optical disk device, or a tape device. The storage device(s) 530 may include read-only memory, random access memory, or both. The storage device(s) 530 may include one or more of an internal hard drive, an external hard drive, or a removable drive.

One or both of the memory 520 or the storage device(s) 530 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 500. In some implementations, the CRSM may include a data store that provides storage of computer-readable instructions or other information in a non-transitory format. The CRSM may be incorporated into the system 500 or may be external with respect to the system 500. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 510 and the memory 520 may be supplemented by, or incorporated into, one or more application-specific integrated circuits (ASICs).

The system 500 may include one or more I/O devices 550. The I/O device(s) 550 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 550 may also include one or more output devices such as a display, LED(s), an audio output device (e.g., a speaker), a printer, a haptic output device, and so forth. The I/O device(s) 550 may be physically incorporated in one or more computing devices of the system 500, or may be external with respect to one or more computing devices of the system 500.

The system 500 may include one or more I/O interfaces 540 to enable components or modules of the system 500 to control, interface with, or otherwise communicate with the I/O device(s) 550. The I/O interface(s) 540 may enable information to be transferred in or out of the system 500, or between components of the system 500, through serial communication, parallel communication, or other types of communication. For example, the I/O interface(s) 540 may comply with a version of the RS-232 standard for serial ports, or with a version of the IEEE 1284 standard for parallel ports. As another example, the I/O interface(s) 540 may be configured to provide a connection over Universal Serial Bus (USB) or Ethernet. In some examples, the I/O interface(s) 540 may be configured to provide a serial connection that is compliant with a version of the IEEE 1394 standard.

The I/O interface(s) 540 may also include one or more network interfaces that enable communications between computing devices in the system 500, or between the system 500 and other network-connected computing systems. The network interface(s) may include one or more network interface controllers (NICs) or other types of transceiver devices configured to send and receive communications over one or more networks using any network protocol.

Computing devices of the system 500 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 500 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, e.g., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method executed by at least one server, the method comprising:
    receiving, by the at least one server, a first request sent from a first computing device, wherein the first request is associated with a transfer of currency from a first account to a second account, wherein the first request is indicative of a value of the currency to be transferred;
    determining, by the at least one server, a first output profile indicating a first time-varying output to be presented via a second computing device, wherein the first output profile is based on the value, wherein the first time-varying output comprises a tactile alert, an audible alert, or a combination of both, and wherein the second computing device is associated with the second account;
    initiating, by the at least one server, the transfer of the value of the currency from the first account to the second account;
    transmitting, by the at least one server, a first signal to the second computing device in response to the transfer being initiated, wherein the first signal causes the second computing device to present, via a component of the second computing device, the first time-varying output indicated in the first output profile;
    receiving, by the at least one server, a second request sent from the first computing device within a predetermined time period, wherein the second request is associated with an additional transfer of currency from the first account to the second account, and wherein the second request is indicative of the same value of the currency to be transferred as provided in the first request;

updating, by the at least one server, the first output profile based on the additional transfer providing the same value of the currency within the predetermined time period, wherein updating the first output profile comprises adjusting a duration of the first time-varying output;

initiating, by the at least one server, the additional transfer of the same value of the currency from the first account to the second account; and transmitting, by the at least one server, a second signal to the second computing device in response to the additional transfer being initiated, wherein the second signal:

causes the second computing device to present, via the component of the second computing device, the first time-varying output with the adjusted duration in response to initiating the additional transfer of the same value.

2. The method of claim 1, wherein the component comprises one or more haptic actuators.

3. The method of claim 1, wherein the first signal instructs the second computing device to present the first time-varying output in real time with initiation of the transfer.

4. The method of claim 1, further comprising:

determining, by the at least one server, a second output profile indicating a second time-varying output to be presented through the first computing device, the second output profile determined based at least partly on an additional value, the first computing device being associated with the first account; and based on the initiating of a third transfer of the additional value, transmitting a third signal to cause the first computing device to present, through one or more presenting components, the second time-varying output indicated in the second output profile.

5. The method of claim 1, further comprising:

receiving, by the at least one server, a specification of the second computing device, wherein the specification was sent, using a short-range communication protocol, from the second computing device in response to the first computing device being within a proximity of the second computing device; and determining, by the at least one server, the second account associated with the specification of the second computing device.

6. The method of claim 1, wherein the first signal comprises the first output profile.

7. The method of claim 1, wherein the first signal comprises an identifier of the first output profile that is employed to select the first output profile from a set of profiles stored on the second computing device.

8. The method of claim 1, wherein the first output profile indicates that the first time-varying output changes, during the duration, from a minimum intensity to a maximum intensity.

9. The method of claim 8, wherein the duration and the maximum intensity are determined based on the value.

10. The method of claim 4, wherein the second output profile indicates that a first intensity in the second time-varying output changes inversely with respect to change of a second intensity in the first time-varying output.

11. The method of claim 4, wherein:

the first output profile indicates that the first time-varying output changes from a first minimum intensity to a first maximum intensity over the duration; and the second output profile indicates that the second time-varying output changes from a second maximum intensity to a second minimum intensity over an additional duration.

12. The method of claim 1, wherein determining the first output profile comprises selecting a profile from a profile database, the profile having an indexed identifier.

13. The method of claim 1, wherein determining the first output profile depends at least in part on an amount in the second account.

14. The method of claim 1, further comprising;

identifying, by the at least one server, the first account based on a sender identification, the sender identification being included in the first request; and identifying, by the at least one server, the second account based on a receiver identification, the receiver identification being included in the first request.

15. The method of claim 1, wherein the first signal causes the second computing device to present a first time-varying alert output according to the first output profile, through:

at least one first speaker;
at least one first light;
at least one first graphic presentation; or
any combination thereof.

16. The method of claim 15, wherein the first signal causes the second computing device to present the first time-varying alert output in real time with the first time-varying output.

17. The method of claim 15, further comprising sending a second signal to cause the first computing device to present a second time-varying alert output according to the first output profile, through:

one or more second speakers;
one or more second lights;
one or more second graphic presentation; or
any combination thereof.

18. A system, comprising:

at least one server; and a memory communicatively coupled to the at least one server, the memory storing instructions which, when executed by the at least one server, cause the at least one server to perform operations comprising:

receiving a first request that is sent from a first computing device, wherein the first request is associated with a transfer of currency from a first account to a second account, wherein the first request is indicative of a value of the currency to be transferred;

determining an output profile indicating a time-varying output to be presented via a second computing device, wherein the output profile is based on the value, wherein the time-varying output comprises a tactile alert, an audible alert, or a combination of both, and wherein the second computing device is associated with the second account;

initiating the transfer of the value of the currency from the first account to the second account;

transmitting a signal to the second computing device in response to the transfer being initiated, wherein the signal causes the second computing device to present, via a component, the time-varying output indicated in the output profile;

receiving a second request that is sent from the first computing device within a predetermined time period, wherein the second request is associated with an additional transfer of currency from the first account to the second account, and wherein the second request is indicative of the same value of the currency to be transferred as provided in the first request;

updating the output profile based on the additional transfer providing the same value of the currency within the predetermined time period, wherein updating the output profile comprises adjusting a duration of the time-varying output;

initiating the additional transfer of the same value of the currency from the first account to the second account; and transmitting a second signal to the second computing device in response to the additional transfer being initiated, wherein the second signal:

causes the second computing device to present, via the component of the second computing device, the time-varying output with the adjusted duration in response to initiating the additional transfer of the same value.

19. One or more non-transitory computer-readable media storing instructions which, when executed by at least one server, cause the at least one server to perform operations comprising:

receiving a first request sent from a first computing device, wherein the first request is associated with a transfer of currency from a first account to a second account, and wherein the first request is indicative of a value of the currency to be transferred;

determining an output profile indicating a time-varying output to be presented via a second computing device, wherein the output profile is based on the value, wherein the time-varying output comprises a tactile alert, an audible alert, or a combination of both, and wherein the second computing device is associated with the second account;

initiating the transfer of the value of the currency from the first account to the second account;

transmitting a signal to the second computing device in response to the transfer being initiated, wherein the signal causes the second computing device to present, via a component of the second computing device, the time-varying output indicated in the output profile;

receiving a second request sent from the first computing device within a predetermined time period, wherein the second request is associated with an additional transfer of currency from the first account to the second account, and wherein the second request is indicative of the same value of the currency to be transferred as provided in the first request;

updating the output profile based on the additional transfer providing the same value of the currency within the predetermined time period, wherein updating the output profile comprises adjusting a duration of the time-varying output;

initiating the additional transfer of the same value of the currency from the first account to the second account; and transmitting a second signal to the second computing device in response to the additional transfer being initiated, wherein the second signal:

causes the second computing device to present, via the component of the second computing device, the time-varying output with the adjusted duration in response to initiating the additional transfer of the same value.

\* \* \* \* \*